United States Patent [19]

Nakasugi et al.

[11] Patent Number: 5,018,880
[45] Date of Patent: May 28, 1991

[54] DYNAMIC PRESSURE BEARING DEVICE

[75] Inventors: Mikio Nakasugi, Chofu; Yoshiaki Watanabe, Yokohama, both of Japan

[73] Assignee: Canon Kabushiki Kaisha, Tokyo, Japan

[21] Appl. No.: 372,613

[22] Filed: Jun. 28, 1989

[30] Foreign Application Priority Data

| Jun. 28, 1988 | [JP] | Japan | 63-158119 |
| Jul. 1, 1988 | [JP] | Japan | 63-162614 |
| Feb. 15, 1989 | [JP] | Japan | 1-035564 |

[51] Int. Cl.⁵ .................................. F16C 17/10
[52] U.S. Cl. ..................... 384/112; 384/107; 384/113
[58] Field of Search ............ 384/112, 123, 107, 120, 384/121, 114, 113

[56] References Cited

U.S. PATENT DOCUMENTS

| 3,399,000 | 8/1968 | Remmers ..................... 384/112 |
| 3,497,273 | 2/1970 | Muijderman et al. |
| 3,927,921 | 12/1975 | Woolley |
| 4,588,288 | 5/1986 | Nakasugi et al. ............... 355/53 |
| 4,764,085 | 8/1988 | Jesinger ...................... 384/123 |
| 4,768,064 | 8/1988 | Isohata et al. ................ 355/53 |
| 4,798,476 | 1/1989 | Sakatani et al. ............... 384/108 |

FOREIGN PATENT DOCUMENTS

| 0117873 | 9/1984 | European Pat. Off. |
| 1501093 | 10/1967 | France |
| 1560068 | 3/1969 | France |
| 2150186 | 3/1973 | France |
| 2231884 | 12/1974 | France |
| 2504620 | 10/1982 | France |
| 1399727 | 7/1975 | United Kingdom |

OTHER PUBLICATIONS

Japanese Patent Abstract, vol. 12, No. 149, published 11/25/87.
Japanese Patent Abstract, vol. 12, No. 459, published 8/1/88.
Japanese Patent Abstract, vol. 12, No. 282, published 3/12/88.

Primary Examiner—Lenard A. Footland
Attorney, Agent, or Firm—Fitzpatrick, Cella, Harper & Scinto

[57] ABSTRACT

A dynamic pressure bearing device a relatively rotatable shaft member and sleeve member, accommodating the shaft member, are relatively supported with respect to a thrust direction and a radial direction, and wherein there is provided a circulation passageway for circulating a fluid along at least a part of a thrust surface between the shaft member and the sleeve member.

14 Claims, 9 Drawing Sheets

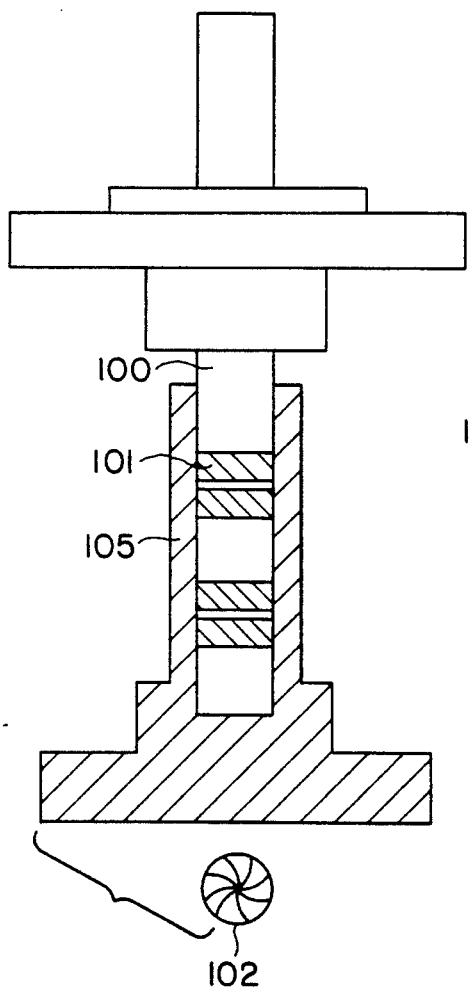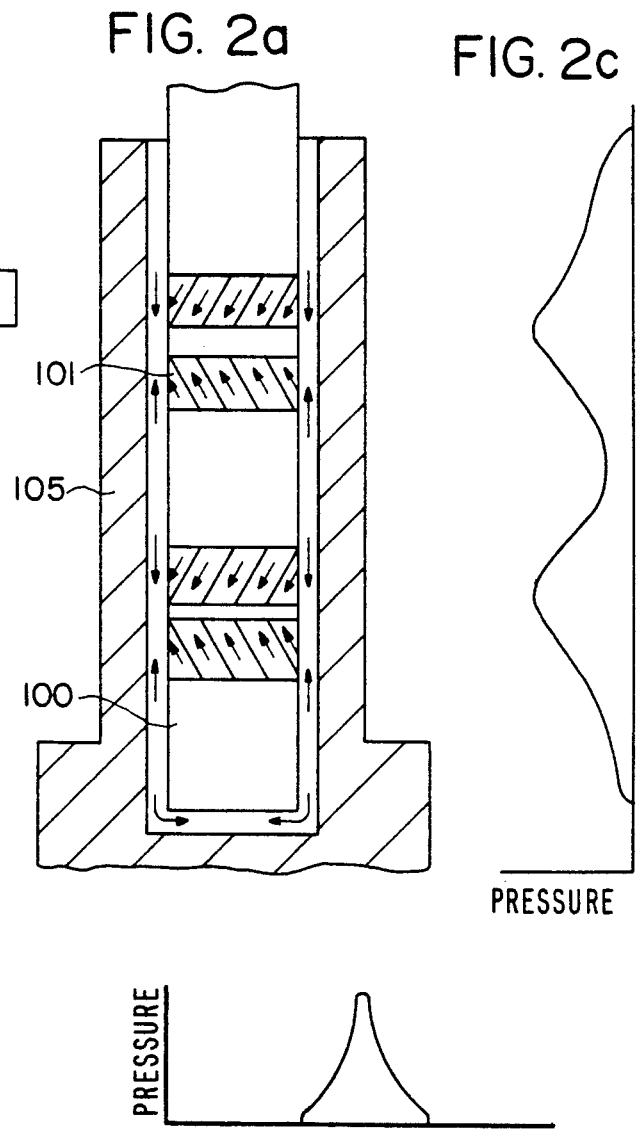
FIG. 1
FIG. 2a
FIG. 2b
FIG. 2c

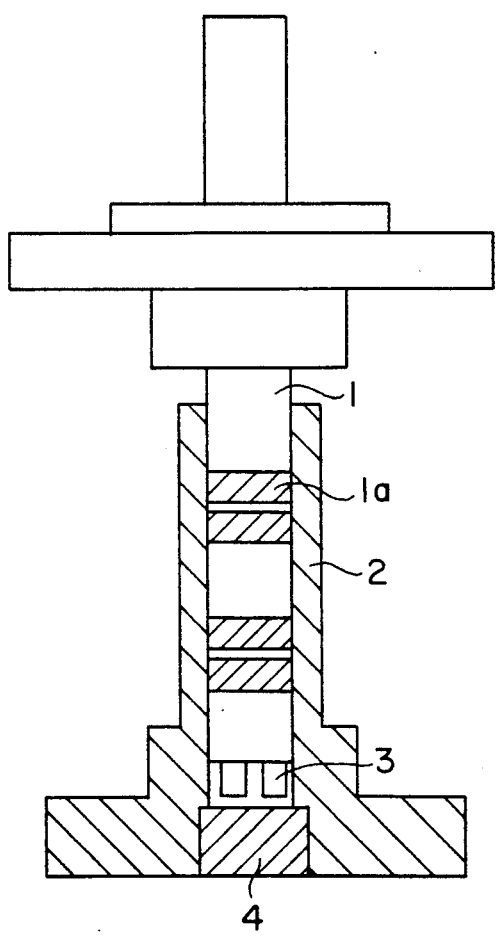
FIG. 3
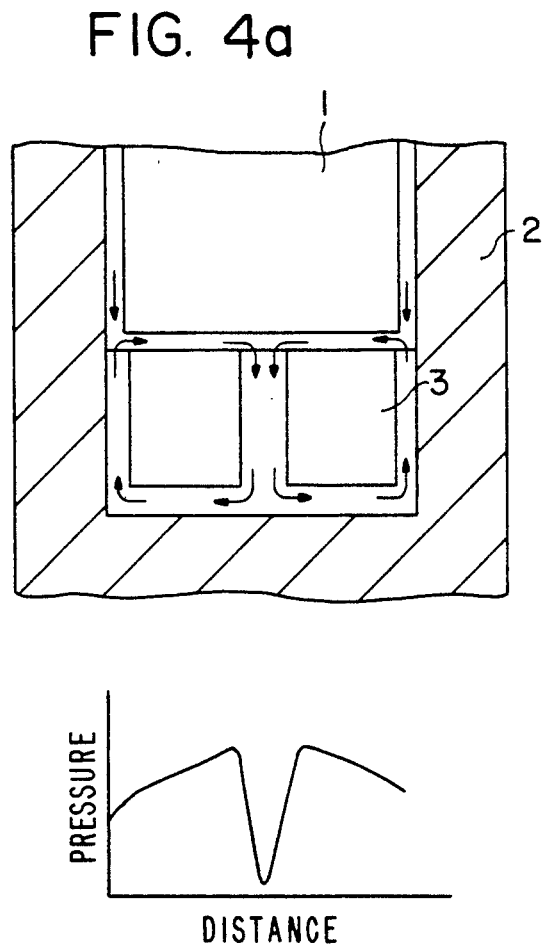
FIG. 4a
FIG. 4b

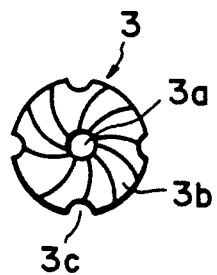 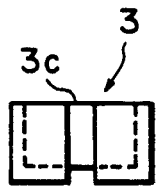 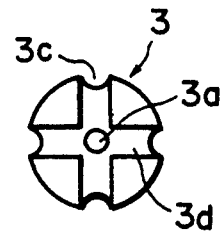
FIG. 5A  FIG. 5B  FIG. 5C
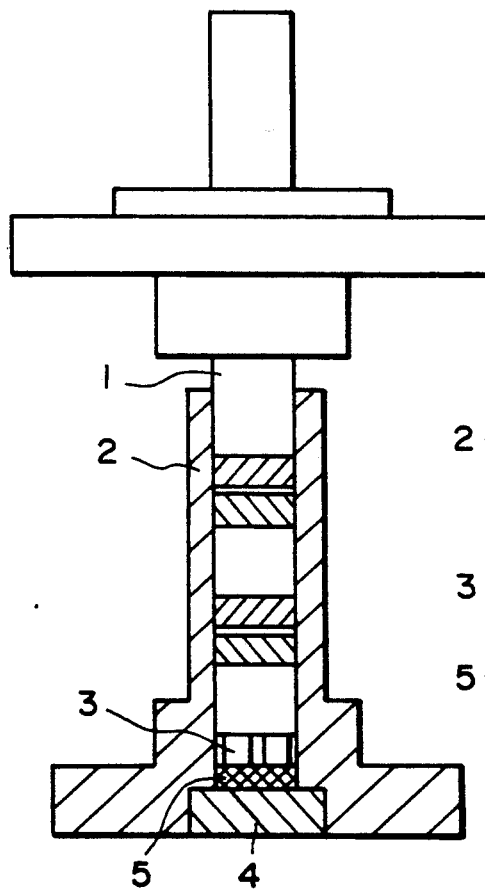 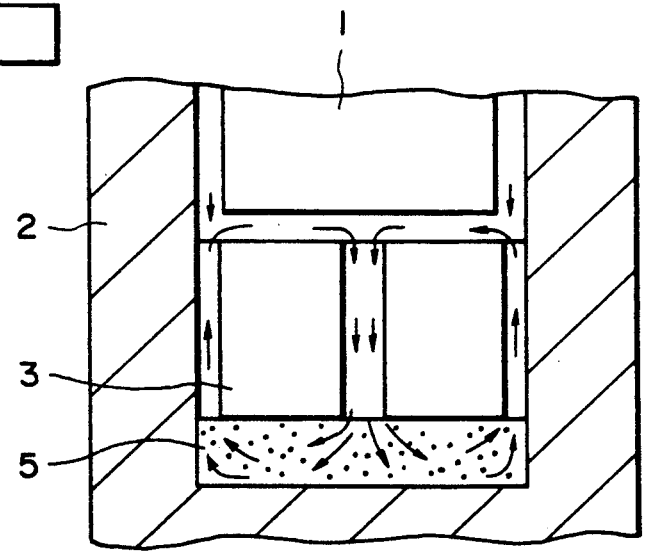
FIG. 6  FIG. 7

DYNAMIC PRESSURE BEARING DEVICE

FIELD OF THE INVENTION AND RELATED ART

This invention relates to a dynamic pressure bearing device suitably usable, for example, in a video deck, a turn table of an audio player, a rotation unit of a deflection scanner in a laser beam printer or otherwise. More particularly, the invention is concerned with a dynamic pressure bearing device using oil lubrication.

A known oil lubrication type dynamic pressure bearing device is shown in FIG. 1, wherein the device includes a shaft 100 having grooves 101 of herringbone shape formed in a radial surface and swirl or spiral grooves 102 formed on a thrust surface, and a sleeve 105 for supporting the shaft 100. The clearance between the shaft 100 and the sleeve 105, of an order of 2-20 microns, is filled with a lubricant oil.

When the dynamic pressure bearing device is not in operation, the oil does not flow and the shaft 100 is contacted to the sleeve 105. As the shaft 100 starts rotation, the oil begins to flow such as depicted by arrows in FIG. 2, (a). Then, as the rotating speed of the shaft 100 gradually increases, under the influence of the herringbone grooves 101 formed in the radial surface the oil produces a radial pressure distribution such as shown in FIG. 2, (c). By means of the lubricant oil having such pressure distribution, the shaft 100 is hydraulically supported in the radial direction without contact to the sleeve 105. On the other hand, with the increasing rotation of the shaft, the oil flows along the spiral grooves 102 formed on the thrust surface, such that the oil produces a pressure distribution such as illustrated in FIG. 2, (b). By this pressure, the shaft 100 is urged upwardly against its weight and the shaft 100 is hydraulically supported in the thrust direction without contact to the sleeve.

SUMMARY OF THE INVENTION

However, with recent tendency to increasing rotating speed of a rotation unit such as one for a rotatable polygonal mirror, for example, the dynamic pressure bearing device of the type described above may cause the following inconveniences:

(1) With increasing speed of rotation, the lubricant oil easily scatters.

(2) With increasing speed of rotation, the flow rate of the oil increases, resulting in creation of an extraordinary large difference between a high pressure zone and a low pressure zone of the pressure distribution. This causes a negative pressure at a peripheral edge portion of the thrust surface of the shaft. At the thrust surface, to such negative pressure zone as compared with the high pressure zone of the pressure distribution shown in FIG. 2, (b), the oil begins to flow. Then, the pressure distribution of the oil at the thrust surface is disturbed, with a result of contact of the shaft 100 to the sleeve 105 at the thrust surface thereof. After this, the oil flows to provide again the pressure distribution such as shown in FIG. 2, (b). The motion such as described above occurs repeatedly, which produces vibration. Therefore, the attitude stability of the shaft 100 is deteriorated to a large extent. Also, there occurs wearing due to the metal contact, which leads to a reduced life time.

It is accordingly a primary object of the present invention to provide a dynamic pressure bearing device which allows high speed rotation without causing the inconveniences such as described above.

In accordance with an aspect of the present invention, there is provided a dynamic pressure bearing device wherein relatively rotatable shaft member and sleeve member, accommodating the shaft member, are relatively supported with respect to a thrust direction and a radial direction, and wherein there is provided a circulation passageway for circulating a fluid along at least a part of a thrust surface between the shaft member and the sleeve member.

In accordance with another aspect of the invention, there is provided a dynamic pressure bearing device which comprises a cylindrical sleeve having an inside peripheral surface and a bottom surface, a shaft rotatably mounted into the sleeve, a fluid medium supplied into a clearance between the sleeve and the shaft, and a first dynamic pressure producing means which is provided on at least one of the inside circumferential surfaces of the sleeve and the shaft and which is operable, when the shaft is rotated relatively to the sleeve, to forcibly circulate the fluid to thereby hydraulically support the shaft both in the radial direction and the thrust direction, wherein there is provided a fluid circulating means for circulating the fluid (lubricant oil) along the bottom surface of the sleeve. This is effective to avoid the inconvenience as stated in item (1).

In accordance with a further aspect of the invention, a fluid receiving recess is formed at the inside circumferential surface of the cylindrical sleeve, at a position on the open end side of the first dynamic pressure producing means, and there is provided a second dynamic pressure producing means which is formed on at least one of the inside circumferential surfaces of the sleeve and the shaft, at a position on the open end side of the recess of the sleeve, the second dynamic pressure producing means being operable, when the shaft rotates relatively to the sleeve, to forcibly circulate the fluid so that the fluid flows into the sleeve.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a sectional view of a known type dynamic pressure bearing device.

FIG. 2 is a schematic representation, illustrating the flow of a lubricant oil in the known type dynamic pressure bearing device, a pressure distribution of the lubricant oil along the sleeve side surface and a pressure distribution of the lubricant oil along the sleeve bottom surface.

FIG. 3 is a sectional view of a dynamic pressure bearing device according to a first embodiment of the present invention.

FIG. 4 is a schematic representation, illustrating an insert member used in the first embodiment and a pressure distribution related thereto.

FIGS. 5A-5C show the insert member used in the first embodiment, wherein FIG. 5A is a plan view, FIG. 5B is a side view and FIG. 5C is a bottom view.

FIG. 6 is a sectional view of a dynamic pressure bearing device according to a second embodiment of the present invention.

FIG. 7 is an enlarged section showing a porous material member used in the second embodiment.

FIGS. 10A-10C show an insert member used in the second embodiment, wherein FIG. 10A is a plan view, FIG. 10B is a side view and FIG. 10C is a bottom view.

FIGS. 15A-15C show an insert member used in the sixth embodiment, wherein FIG. 15A is a plan view, FIG. 15B is a side view and FIG. 15C is a bottom view.

DESCRIPTION OF THE PREFERRED EMBODIMENTS

Figure 8:
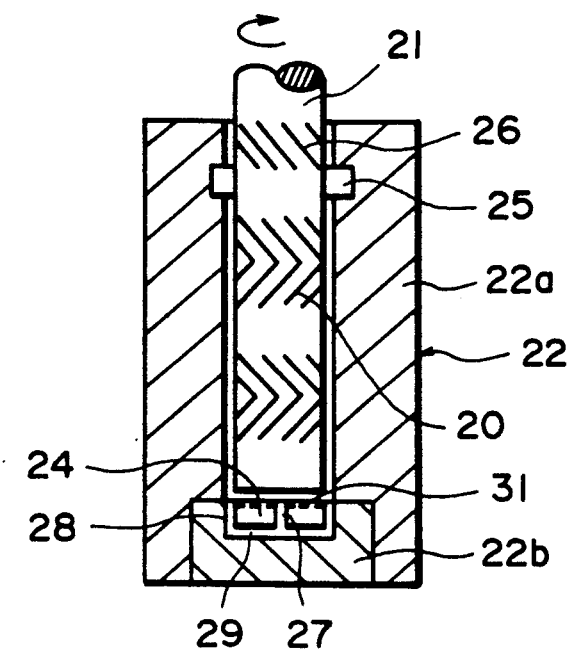
FIG. 8 is a sectional view of a dynamic pressure bearing device according to a third embodiment of the present invention.

Referring to FIGS. 3-5, showing the first embodiment of the present invention, a shaft 1 has grooves 1a of herringbone shape formed with a depth of about 2-20 microns in the radial direction (a direction perpendicular to the axial direction of the shaft). Sleeve 2 receives the shaft 1, and one of them is rotatable. In this embodiment, the shaft 1 is rotatable to the sleeve 2. Insert member 3 which is substantially in the form of a cylinder has a central bore 3a, swirl of spiral pattern grooves 3b formed on its surface for bearing the shaft 1, and grooves 3c formed in the circumferential surface thereof to extend in the thrust direction (a direction parallel to the axial direction), as shown in FIGS. 5A-5C. Closing member 4 is press-fitted into the sleeve 2 so as to close the same against leakage of an oil.

The dynamic pressure bearing device can be assembled in the following manner: First, an insert member 3 such as shown in FIG. 5 is press-fitted into the sleeve 2 from the bottom surface of the sleeve. Thereafter, the closing member 4 is press-fitted into the sleeve. Then, an oil is injected into the sleeve 2. Finally, the shaft 1 is inserted into the sleeve 2 from the above so that the former is fitted into the latter.

The operation of the present embodiment will now be explained. During low speed rotation, the oil flows along the herringbone grooves 1a such as shown in FIG. 3, whereby a pressure distribution such as shown in FIG. 2, (c), is formed on the radial surface (a surface to which a force in the radial direction is applied). By this, the shaft 1 and the sleeve 2 are maintained in a non-contact relationship in the radial direction. Also, in the range of low speed rotation and middle speed rotation, first at the thrust surface (a surface to which a force in the thrust direction is applied) the oil begins to flow along the spiral grooves 3b. The groove 3b is shallow, as having a depth of about 2-20 microns. Since the oil continuously flows, the pressure becomes higher as the oil comes closer to the central part of the shaft. Since the insert member 3 has its bore 3a formed at the central part thereof, the oil flows into the bore 3a. Thereafter, the oil goes through a C-shaped groove 3d and then flows along the groove 3c, such as illustrated in FIG. 4, (a). Thus, as a result of the oil circulation described above, the oil pressure, at the shaft thrust surface and the insert member 3, produces such pressure distribution as depicted in FIG. 4, (b). Therefore, there is produced no negative pressure in the neighborhood of the peripheral edge portion of the shaft.

FIGS. 6 and 7 show a second embodiment of the present invention. Same reference numerals are assigned to the elements corresponding to those of the first embodiment. In this embodiment, a porous material member 5 is interposed between a insert member 3 and a closure member 4. For assembling of the dynamic pressure bearing device of the present embodiment, the insert member 3 is press-fitted into a sleeve 2 and then the porous material member 5 is press-fitted thereinto. Thereafter, the closure member 4 is press-fitted into the sleeve 2. Subsequently, an oil is injected into the sleeve 2 and then a shaft 1 is inserted from the above. Here, the porous material member 5 may be integral with or separate from the insert member 3. As for the porous material member, preferably it may be a molded part made of stainless steel or ceramics.

In the second embodiment, the porous material member 5 is interposed at least at a part of an oil circulation passageway, such that a filtering function is provided and any powder in the oil produced by wearing can be removed by the porous material member 5. While such a porous material member is used in this embodiment as a filter, any other member may be used provided that it has a filtering function.

Although the first and second embodiments use an insert member having at least one of a bore and a groove, for circulation of the oil, the oil can be circulated without use of such an insert member, for example, by providing the sleeve itself with a groove or bore. By way of example, such a groove or bore may be formed directly on the closure member 4.

In the foregoing embodiments, the oil can be circulated not only in the circumferential direction along the radial surface but also in the thrust direction (vertical circulation). Also, the oil circulation at the thrust surface of the shaft effectively avoids the creation of negative pressure at the thrust of the shaft. This prevents contact between the sleeve and the shaft which otherwise may be caused during the rotation. Also, the vibration or non-uniform rotation does not easily occur. Further, good oil circulation is provided and a larger amount of oil can be used without increasing the resistance between the sleeve and the shaft due to the oil. Therefore, temperature increase can be prevented.

Also, by this oil circulation, galling due to the powder produced by wearing can be reduced.

The circulating function at the thrust surface can be provided by forming a bore or groove in the shaft, for example. However, with the reduction in size of the device followed by reduction in diameter of the shaft to a size of 2-3 mm, forming such a bore or groove in the shaft easy. Further, if such a bore or groove is formed after a herringbone groove which determines the flow of the oil is formed on the shaft, the precision is not good. In the foregoing embodiments, as compared therewith, after the machining the insert member is press-fitted into the sleeve. This facilitates the process and, as a result, allows reduction in cost.

A third embodiment of the present invention will now be explained. FIG. 8 is a sectional view of a dynamic pressure bearing device according to this embodiment.

In FIG. 8, denoted at 22 is a sleeve which is in the form of a cylinder having an inside circumferential surface and a bottom surface. In the embodiment as illustrated, the sleeve 22 is provided by a cylinder 22a and a thrust plate 22b fixed to the bottom of the cylinder 22a. Rotational shaft 21 is rotatably mounted into the sleeve 22, and the shaft can be rotated by a driving means, not shown, of the rotation unit.

Denoted at 20 is a herringbone shallow groove formed on the outside circumferential surface of the rotational shaft 21, for producing a dynamic pressure supporting the shaft in the radial direction. The groove 20 has a depth of about 2-20 microns. While in the illustrated embodiment the shallow groove 20 is provided on the outside circumferential surface of the rotational shaft 21, it may be provided on the inside circumferential surface of the sleeve 22 or, alternatively, both of the shaft and the sleeve may be provided with such grooves. Further, as illustrated, in this embodiment there are provided two herringbone grooves at two different sites on the outside circumferential surface of the shaft. However, three or more herringbone grooves may be provided.

Figure 10A:
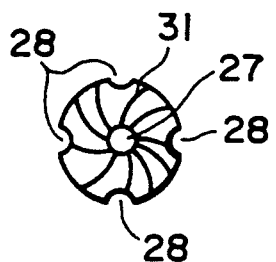
Figure 10B:
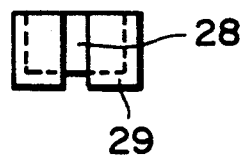
Figure 10C:
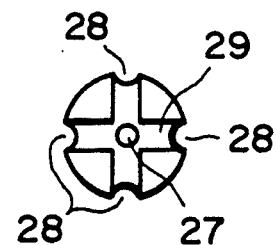

Denoted at 24 is an insert member which is fixed to the thrust plate 22b. As illustrated in FIGS. 10A-10C, the insert member has a central bore 27 which is formed at the center of the insert member to extend in the axial direction; a radial groove 29 formed on the bottom of the insert member 24 to extend radially outwardly from the central bore 27; peripheral grooves 28 formed on the outside circumferential part of the insert member 24 to extend parallel to the central bore 27; and spiral shallow grooves 31 formed on the top surface of the insert member 24 with a depth of about 2-20 microns.

Denoted at 25 is a recess formed in the sleeve 22 at a position which is on the open end side of the shallow groove 20 (a side of the groove close to the open end of the sleeve). Denoted at 26 are shallow grooves, having a depth of about 2-20 microns, formed on the open end side of the recess 25 of the sleeve 22. These grooves are so formed that, as the rotational shaft 21 rotates within the sleeve 22, a lubricant oil with which the clearance between the rotational shaft 21 and the sleeve 22 is filled, is caused to flow in a direction to the inside of the sleeve 22. In the illustrated embodiment, the shallow grooves 26 are provided on the outside periphery of the rotational shaft 21. However, they may be provided on the inside circumferential surface of the sleeve 22 or, alternatively, both of the rotational shaft and the sleeve may be provided with such grooves.

Figure 9:
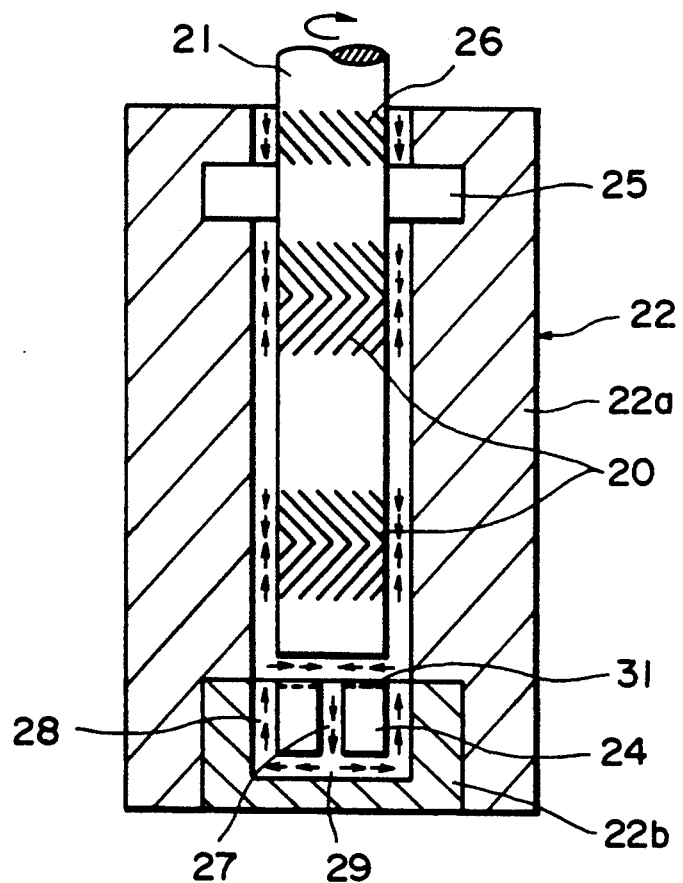
FIG. 9 is a sectional view, illustrating the function of the dynamic pressure bearing device of the third embodiment.

Referring now to FIG. 9, the function of the dynamic pressure bearing device of this embodiment will be explained.

Arrows in the drawing denote the direction of flow of the lubricant oil. The function and the effect of the bore formed in the insert member 24 are the same as those of the insert member used in the first embodiment.

As described, the sleeve 22 is provided with a recess 25 of a depth of about 0.01-1 mm, at a part adjacent to the open end thereof. Further, at a position outside thereof, shallow grooves 26 of a depth of about 2-20 microns are formed on the outer circumferential surface of the rotational shaft 21 these grooves being adapted to cause the lubricant oil to flow into the sleeve 22. With this arrangement, the lubricant oil can be kept within the recess 25, without scattering toward the outside, even when the rotational shaft 21 rotates at a high speed.

Thus, the recess 25 can function as a reservoir for the fluid forcibly fed under pressure into the sleeve by the shallow grooves 25. The recess 25 may be provided on the shaft.

Figure 11:
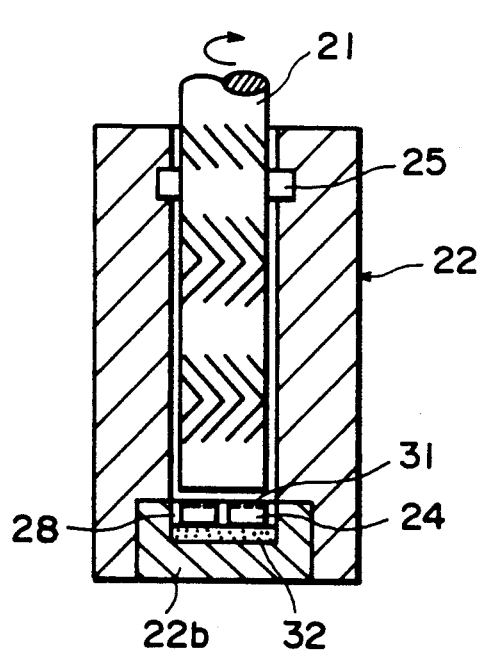
FIG. 11 is a sectional view of a dynamic pressure bearing device according to a fourth embodiment of the present invention.

FIG. 11 is a sectional view of a dynamic pressure bearing device according to a fourth embodiment of the present invention. In this embodiment, a porous material member 32 is mounted into a radial bore 29 of an insert member 24, such as shown in FIG. 8. By the intervention of the porous material member 32 at a part of the circulation passageway for the lubricant oil, any powder in the lubricant oil produced by wearing can be removed (collected).

The porous material member 32 may be integral with or separate from the insert member 24 or the sleeve 22. In any case, substantially the same effect is attainable.

Figure 12:
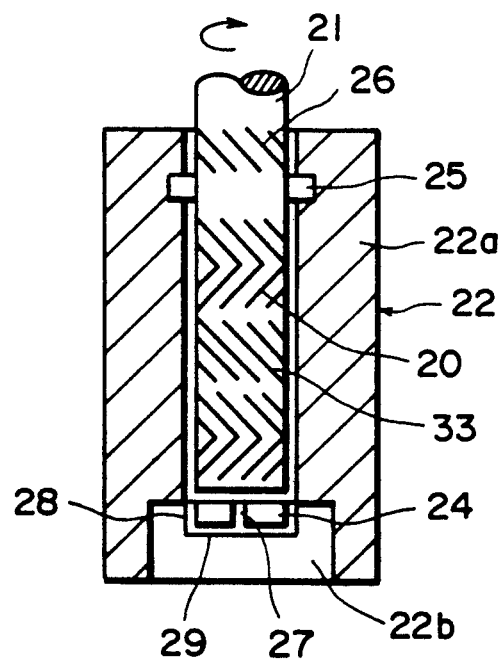
FIG. 12 is a sectional view of a dynamic pressure bearing device according to a fifth embodiment of the present invention.

FIG. 12 is a sectional view of a dynamic pressure bearing device according to a fifth embodiment of the present invention. In this embodiment, shallow grooves 33 formed in the outside circumferential surface of a rotational shaft 21 function to feed, under pressure, the lubricant oil toward the bottom of the sleeve 22. As a result, the lubricant oil which is at the clearance between the bottom of the sleeve 22 and the bottom of the rotational shaft 21 has a high pressure, such that it supports the rotational shaft 21 out of contact to the sleeve. In this case, the spiral shallow grooves 31 of the insert member 24 are not necessary.

In the fourth and fifth embodiments as described above, the elements corresponding to those in the third embodiment are denoted by like numerals.

Figure 13:
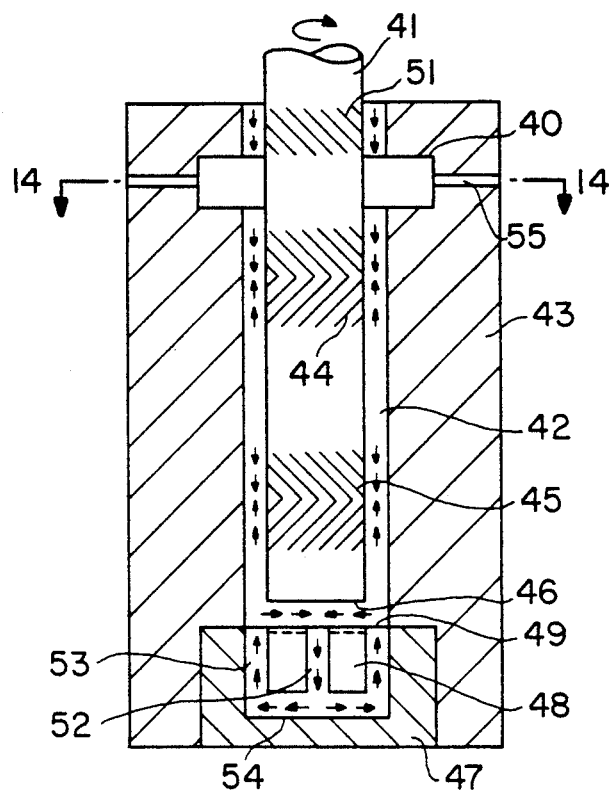
FIG. 13 is a sectional view of a dynamic pressure bearing device according to a sixth embodiment of the present invention.
Figure 14:
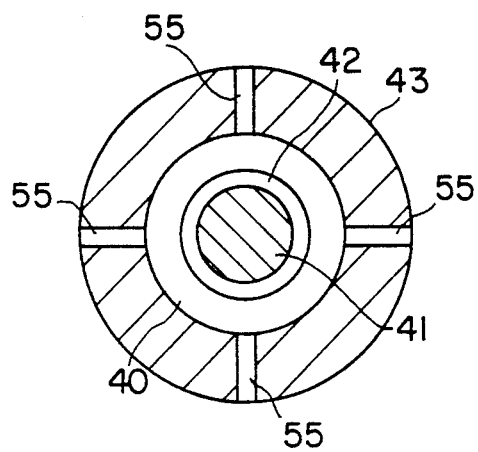
FIG. 14 is a cross-section taken on a line 14—14 FIG. 13.

Referring now to FIGS. 13-15, a sixth embodiment of the present invention will now be explained.

Figure 15A:
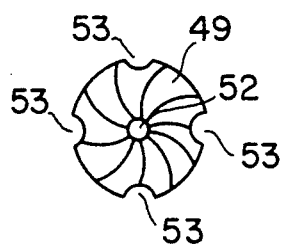
Figure 15B:
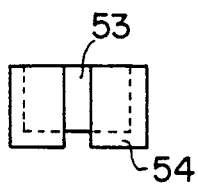
Figure 15C:
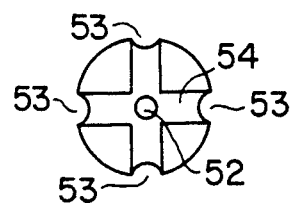

Denoted at 41 is a shaft which is rotatable while supporting a rotation unit such as a polygonal scanner mirror, for example. The shaft is rotatably mounted to a sleeve 43 with the intervention of a fluid 42 such as a lubricant oil. Denoted at 44 and 45 are herringbone shallow grooves formed in the radial surface of the shaft 41. Each groove has a depth of about 2-20 microns. Denoted at 46 is an end face of the shaft 41. An inside bottom face of the sleeve 43, opposed to the end face 46, is provided by an insert member 48 mounted into a recess formed in a thrust plate 47. As shown in FIGS. 15A-15C, the insert member 48 has spiral shallow grooves 49 formed on the surface thereof to a groove depth of about 2-20 microns; a central bore 52 formed at the central part thereof; vertical grooves 53 formed in the outside circumferential part thereof; and a radial bottom groove 54 formed on the bottom thereof to communicate the central bore 52 with the vertical grooves 53. At the inside part of the sleeve 43 adjacent to an open end thereof, there is formed a ring-like inside groove of a groove depth of about 0.01–2 mm. Further, at a part of the radial surface of the shaft 41, which is on the open end side of the inside groove 10 (a side of the groove close to the open end of the sleeve), there are formed spiral shallow grooves 40 to a groove depth of about 2–20 microns. Additionally, in this embodiment, small-diameter bores 55 each in the form of a radial throughbore of an order of $\phi$0.1–1.0, are formed in the inside groove 40 so as to open the inside pressure to the atmosphere.

The operation of the present embodiment will now be explained.

As the shaft 41 rotates, by the action of the shallow grooves 44 and 45 there is produced a dynamic pressure in the radial direction (FIG. 2, (c)), so that in this radial direction the shaft 41 and the sleeve 43 are maintained in a non-contact state. Also, by the action of the shallow grooves 49, the lubricant oil is forcibly flown into the sleeve, without being scattered even by the high speed rotation.

By this pressure supplied fluid, the pressure in the inside groove 40 increases. However, any excessive increase in the pressure within the inside groove 40 is accommodated by the small-diameter bores 55 formed in the inside groove 40. More particularly, these small-diameter bores 55 are communicated with the outside atmosphere, such that when the pressure in the inside groove 40 increases the fluid enters into the bores 55. Within each small-diameter bore, due to the effect of pneumatic spring in relation to the atmosphere (ambience pressure), the pressure can be alleviated. Each bore 55 has a very small diameter and, by the function of the surface tension or conduit resistance, the fluid entering into the small-diameter bore 55 does not leak outwardly from the bore. This arrangement is effective to prevent the fluid having been pressure-supplied by the shallow grooves 51, from providing an excessive floating force in the thrust direction.

Figure 16:
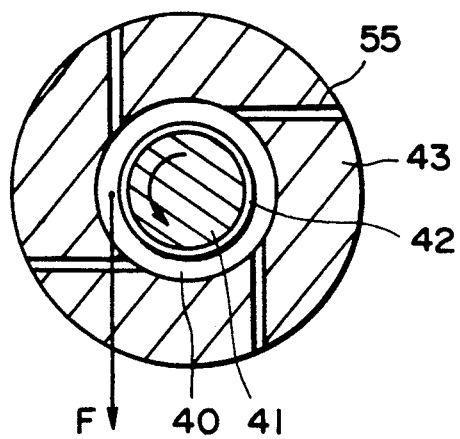
FIG. 16 is a cross-section showing a major portion of a dynamic pressure bearing device according to a seventh embodiment of the present invention.

FIG. 16 shows a seventh embodiment of the present invention, wherein the elements corresponding to those in the sixth embodiment are denoted by like numerals.

In this embodiment, small-diameter bores 55 are formed in an inside groove 40 of a sleeve 43, each being provided substantially in a direction tangent to a centrifugal force F to be applied to the fluid 42 by the rotation of the shaft 41.

By the provision of these small-diameter bores 55 each in a direction opposed to the centrifugal force F to be applied to the fluid 42, as compared with the previous embodiment, the possibility of leakage of the fluid 42 from the small-diameter bores 55 due to the centrifugal force F caused when the shaft 41 rotates at a high speed, can be reduced.

Further, the provision of each small-diameter bore 55 substantially in a tangential direction, is effective to increase the conduit length, as compared with the sixth embodiment wherein the small-diameter bores 55 are provided radially. Namely, the conduit resistance of the small-diameter bores 55 is larger and, therefore, the prevention of leakage of the fluid 42 to the outside is better.

Figures 17, 18:
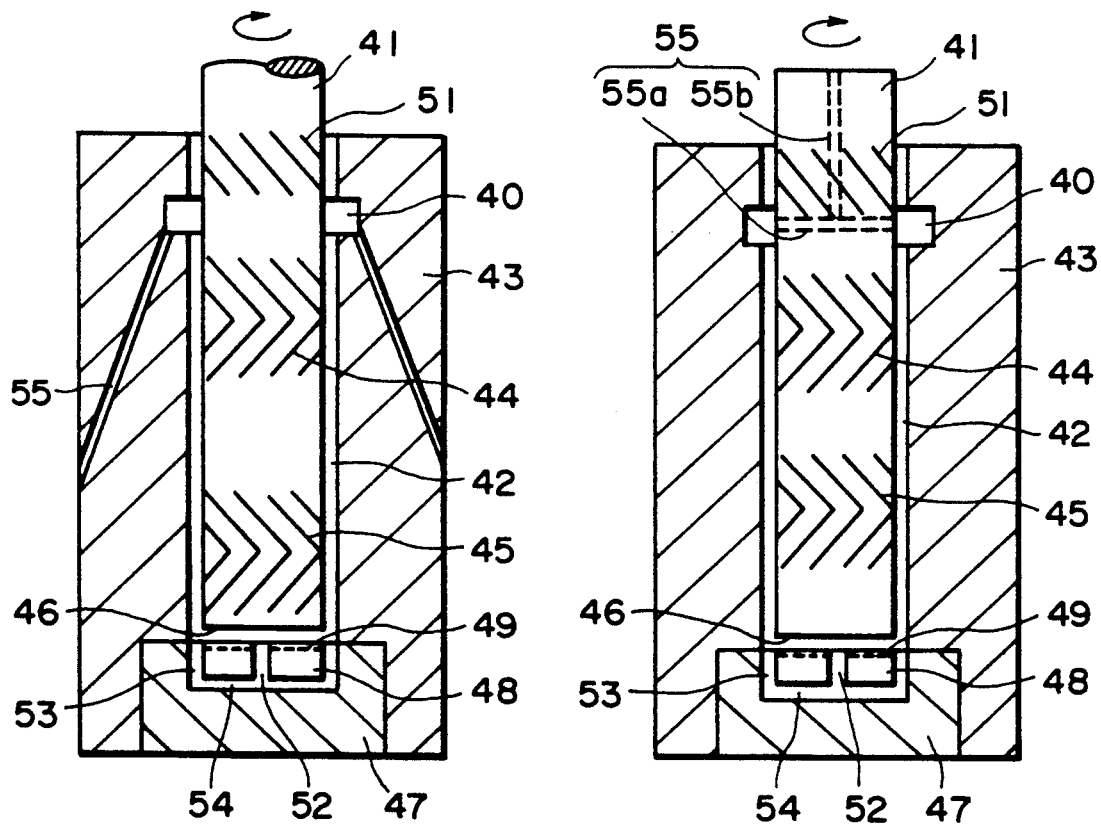
FIG. 17 is a section of a dynamic pressure bearing device according to an eighth embodiment of the present invention.
FIG. 18 is a section of a dynamic pressure bearing device according to a ninth embodiment of the present invention.

FIG. 17 shows an eighth embodiment of the present invention, wherein the elements corresponding to those in the sixth embodiment are denoted by like numerals.

In this embodiment, small-diameter bores 55 are formed in an inside groove 40 of a sleeve 43 and are formed downwardly with a certain inclination with respect to the axial direction of the sleeve 43.

Thus, the conduit length can be prolonged as compared with a case where the bores are provided orthogonally to the shaft 41 and, therefore, the conduit resistance of the small-diameter bores 55 increases. As a result, the prevention of leakage of the fluid 42 to the outside is improved.

FIG. 18 shows a ninth embodiment of the present invention, wherein the elements corresponding to those in the sixth embodiment are denoted by like numerals.

In this embodiment, small-diameter bores 55 are formed not in a sleeve 43 but in a shaft 41. These small-diameter bores 55 are provided by lateral bores 55a each being formed radially outwardly at an outside circumferential position of the shaft 41 corresponding to the inside groove 40 of the sleeve 43, and a longitudinal bore 55b provided in the direction of the central axis of the shaft 41. At the center of the shaft 41, these lateral bores 55 are communicated with the longitudinal bore 55b.

Accordingly, while the centrifugal force acting on the fluid 42 causes the fluid 42 to apply a force radially outwardly of the shaft 41, the provision of the small-diameter bores 55 within the shaft 41, actable against the direction of the action of the force, is effective to prevent, with certainty, the leakage of the fluid 42 to the outside.

Although in the first to ninth embodiments description has been made to a dynamic pressure bearing device of the type that a shaft 41 is rotatable and a sleeve 43 is stationary, the invention is of course applicable also to such dynamic pressure bearing device of the type in which a shaft 41 is stationary while a sleeve 43 is rotatable.

Any one of the foregoing embodiments may be combined with another. For example, the eighth embodiment and the ninth embodiment may be combined to ensure further prolongation of the conduit length. Description will now be made of tenth and eleventh embodiments of the present invention, wherein a dynamic pressure bearing device such as of the sixth embodiment is used in a scanning optical system of a laser beam printer, for example, or a cylinder head of a video instrument such as a VTR.

Figure 19:
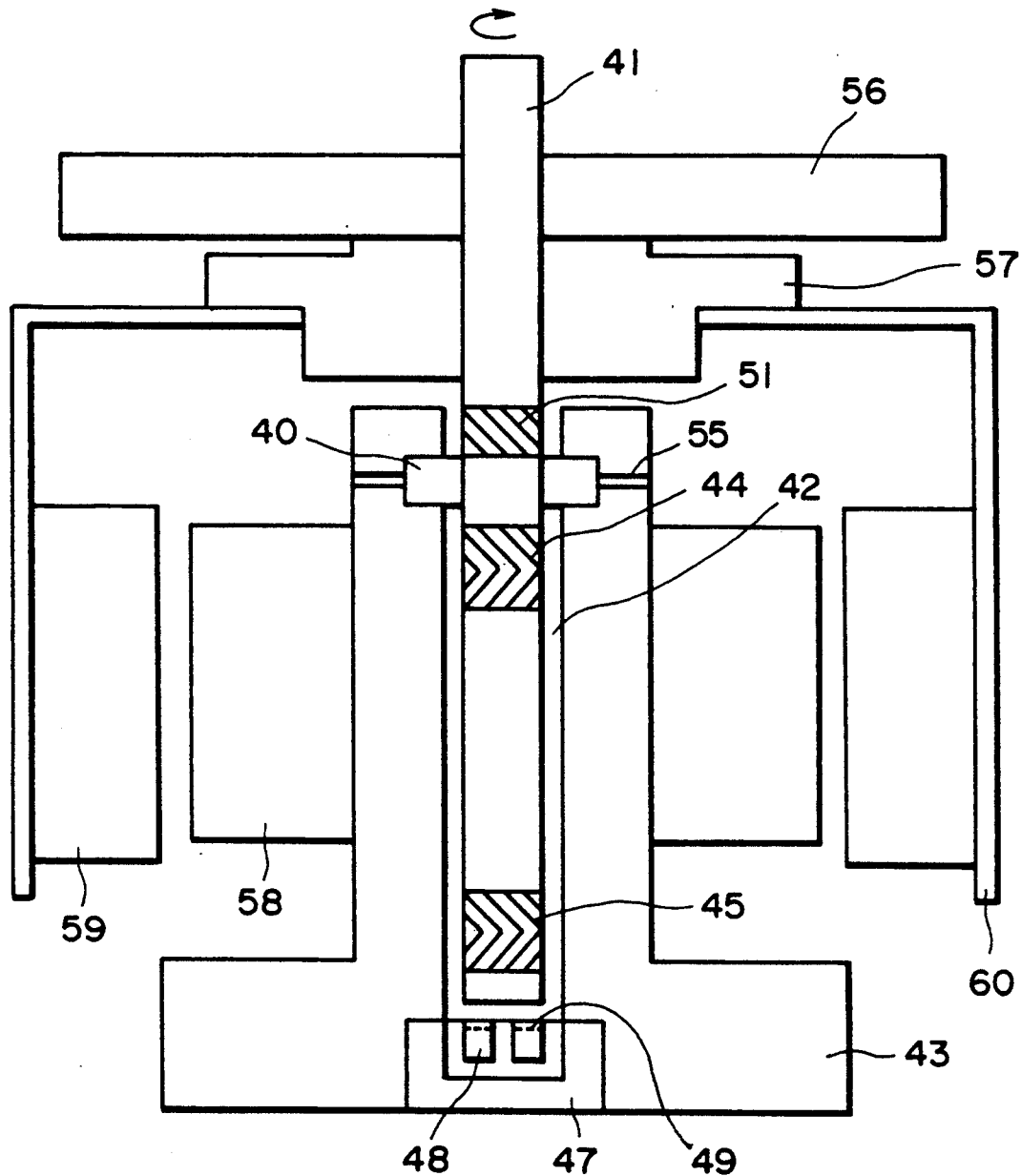
FIG. 19 is a section of a dynamic pressure bearing device according to a tenth embodiment of the present invention.

FIG. 19 shows the tenth embodiment wherein the dynamic pressure bearing device is used in a scanning optical system for a laser beam printer. The same reference numerals are assigned to corresponding elements.

Denoted in FIG. 19 at 56 is a polygonal mirror coupled to a supporting member 57 and a shaft, for scanning a laser beam; at 57 is the supporting member for supporting the polygonal mirror 56 and being coupled to the shaft 41; at 58 and 59 are a motor coil and a motor magnet, for rotating the shaft 41 relatively to a sleeve, the motor coil and the motor magnet being driven in response to a driving signal supplied thereto from a driving means, not shown.

Denoted at 60 is a frame member fixed to a supporting member 57 for supporting the motor magnet 59.

In operation of the described structure, by the action of the motor magnet 60 and the motor coil 58, the shaft 41 is rotated to cause rotation of the polygonal mirror 56. In response, dynamic pressure producing grooves 44, 45 and 49 operate to produce a dynamic pressure by which the shaft 41 and the polygonal mirror 56 are supported stably, with respect to both the thrust direction and the radial direction. Thus, they can be rotated stably.

Figure 20:
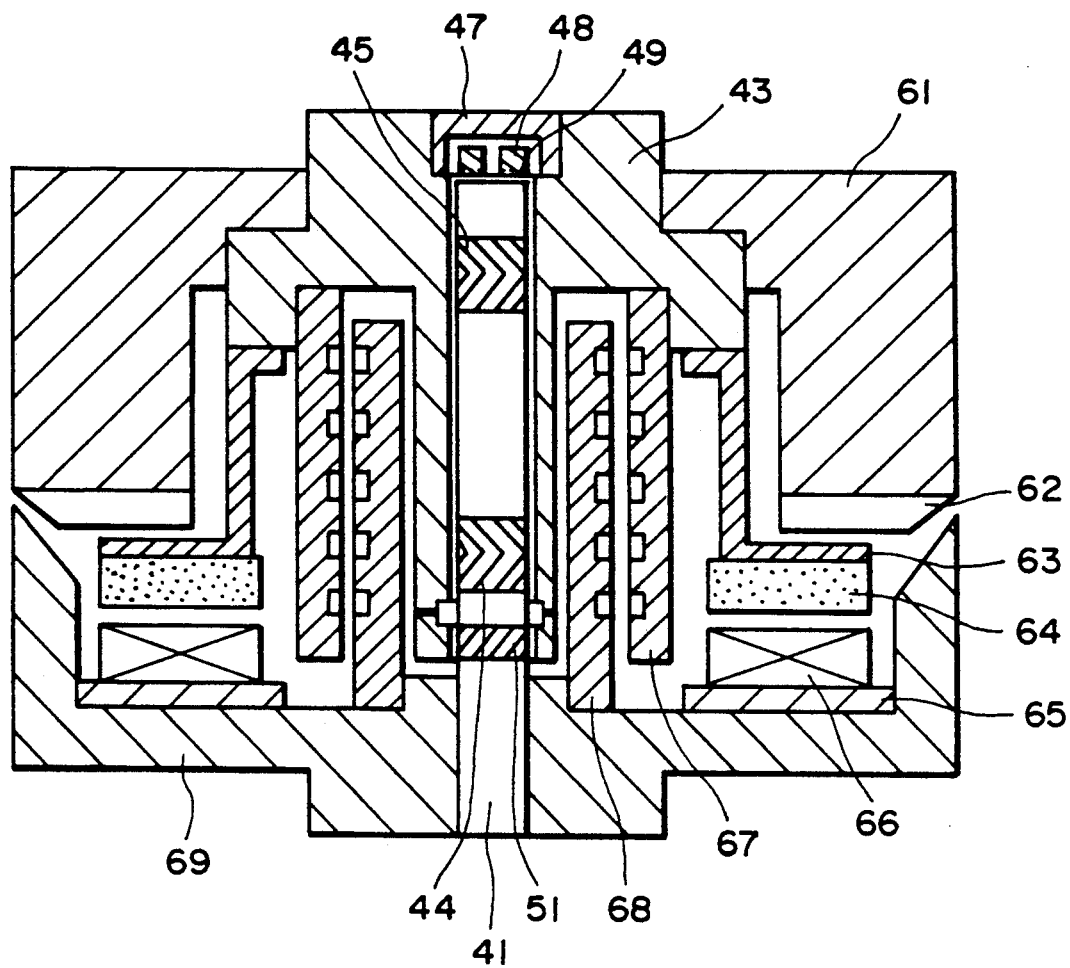
FIG. 20 is a sectional view of a dynamic pressure bearing device according to an eleventh embodiment of the present invention.

FIG. 20 shows the eleventh embodiment, wherein a dynamic pressure bearing device such as of the sixth embodiment is used in a cylinder head which is used in a video instrument such as a VTR or otherwise, for information recording and reproduction. Same reference numerals are assigned to corresponding elements.

Denoted at 61 is an upper drum fixed to a sleeve 43; at 62 is a rotary head secured at a predetermined position on an end portion of the upper drum 61; at 63 is a magnet yoke; at 64 is a motor magnet coupled to the sleeve 43 by way of the magnet yoke 63; at 65 is a yoke; at 66 is a motor coil coupled to a lower drum 69 through the yoke 65; at 67 is a rotor of a rotary capacitor, having an inside surface opposed to a stator 68 and an end thereof fixed to the sleeve 43; at 68 is the stator of the rotary capacitor, which is concentric with the shaft 41 and is fixed to the lower drum 69.

In operation, by the action of the motor magnet 64 and the motor coil 66, the sleeve 43 is rotated. As the sleeve 43 rotates, video information recorded on a video tape (not shown) contacted to the upper and lower drums is picked up, the thus read signal is transmitted, without contact, from the rotor 67 to the stator 68 and, finally, it is transmitted to a signal processing means, not shown.

While the invention has been described with reference to the structures disclosed herein, it is not confined to the details set forth and this application is intended to cover such modifications or changes as may come within the purposes of the improvements or the scope of the following claims.

What is claimed is:

1. A dynamic pressure bearing device, comprising:
    a shaft member;
    a sleeve member rotatable relative to said shaft member and for accommodating said shaft member therein;
    first dynamic pressure producing means for producing a dynamic pressure for relatively supporting said shaft member and said sleeve member in a radial direction;
    second dynamic pressure producing means for producing a dynamic pressure for relatively supporting said shaft member and said sleeve member in a thrust direction, said second dynamic pressure producing means being defined between a free end face of said shaft member and said sleeve member and including a thrust surface opposed to said free end face of said shaft member; and
    a circulation passageway for circulating a fluid along at least a part of said thrust surface, said circulation passageway including a path for flowing the fluid from a middle portion of said thrust surface toward an outer periphery of said thrust surface substantially without flowing through said first dynamic pressure producing means.

2. A dynamic pressure bearing device according to claim 1, further comprising a porous material member provided in said fluid circulation passageway.

3. A dynamic pressure bearing device according to claim 2, wherein said porous material member is made of stainless steel.

4. A dynamic pressure bearing device according to claim 2, wherein said porous material member is made of ceramics.

5. A dynamic pressure bearing device, comprising:
    a shaft member,
    a sleeve member accommodating said shaft member, with said shaft member being rotatable relative to said sleeve member and supported therein in a thrust direction and a radial direction;
    a dynamic pressure producing portion for producing a dynamic pressure for relatively supporting said shaft member and said sleeve member in the radial direction;
    a recess formed on said sleeve member at a position between said dynamic pressure producing portion and an open end of said sleeve member; and
    a forcibly circulating portion formed on one of said shaft member and said sleeve member, at a position between said recess and the open end of said sleeve, for forcibly circulating a fluid into said sleeve when said shaft member rotates relatively to said sleeve member.

6. A dynamic pressure bearing device according to claim 5, further comprising a fluid circulating passageway for circulating a fluid along at least a part of a thrust surface between said shaft member and said sleeve member.

7. A dynamic pressure bearing device according to claim 6, further comprising a porous material member provided in said fluid circulation passageway.

8. A dynamic pressure bearing device according to claim 7, wherein said porous material member is made of stainless steel.

9. A dynamic pressure bearing device according to claim 7, wherein said porous material member is made of ceramics.

10. A dynamic pressure bearing device, comprising:
    a shaft member,
    a sleeve member accommodating said shaft member, with said shaft member being rotatable relative to said sleeve member and supported therein in a thrust direction and a radial direction;
    a dynamic pressure producing portion for producing a dynamic pressure to relatively support said shaft member and said sleeve member in the radial direction;
    a recess formed on one of said shaft member and said sleeve member, at a position between said dynamic pressure producing portion and an open end of said sleeve member, for receiving a fluid;
    a forcibly circulating portion provided on one of said shaft member and said sleeve member, at a position between said recess and the open end of said sleeve member, for forcibly circulating a fluid into said sleeve; and
    a throughbore formed in one of said shaft member and said sleeve member and being communicated with an ambience and a clearance between said shaft member and said sleeve, with said throughbore being defined between said dynamic pressure producing portion and said forcibly circulating portion.

11. A dynamic pressure bearing device according to claim 10, further comprising a fluid circulating passageway for circulating a fluid along at least a part of a thrust surface between said shaft member and said sleeve member.

12. A dynamic pressure bearing device according to claim 11, further comprising a porous material member provided in said fluid circulation passageway.

13. A dynamic pressure bearing device according to claim 12, wherein said porous material member is made of stainless steel.

14. A dynamic pressure bearing device according to claim 12, wherein said porous material member is made of ceramics.

* * * * *

UNITED STATES PATENT AND TRADEMARK OFFICE
CERTIFICATE OF CORRECTION

PATENT NO. : 5,018,880
DATED : May 28, 1991
INVENTOR(S) : Mikio Nakasugi, et al.

It is certified that error appears in the above-identified patent and that said Letters Patent is hereby corrected as shown below:

COLUMN 3:

Line 21, "line 14-14 FIG." should read
--line 14-14 in FIG.--.

COLUMN 5:

Line 8, "shaft easy." should read
--shaft is not easy.--.

Signed and Sealed this

Thirteenth Day of October, 1992

Attest:

DOUGLAS B. COMER

*Attesting Officer*    Acting Commissioner of Patents and Trademarks